United States Patent [19]

Mudge

[11] Patent Number: 4,961,993
[45] Date of Patent: Oct. 9, 1990

[54] ETHYLENE VINYL ACETATE-DIOCTYL MALEATE-2-ETHYLHEXYL ACRYLATE INTERPOLYMERS

[75] Inventor: Paul R. Mudge, Belle Mead, N.J.

[73] Assignee: National Starch and Chemical Investment Holding Corporation, Wilmington, Del.

[21] Appl. No.: 450,951

[22] Filed: Dec. 15, 1989

Related U.S. Application Data

[62] Division of Ser. No. 169,632, Mar. 17, 1988, Pat. No. 4,908,268.

[51] Int. Cl.$^5$ .......................... C08F 20/10; C09J 7/02
[52] U.S. Cl. .................... 428/343; 428/355; 428/518; 526/318.44; 526/318.43
[58] Field of Search ............ 428/343, 355, 518; 526/318.44, 318.43

[56] References Cited

U.S. PATENT DOCUMENTS

| | | | |
|---|---|---|---|
| 2,480,551 | 5/1945 | Coffman et al. | 526/324 |
| 2,965,617 | 12/1960 | MacDonald | 526/318 |
| 3,201,374 | 8/1965 | Simms | 260/80 |
| 3,268,357 | 8/1966 | Hart et al. | 117/122 |
| 3,345,318 | 10/1967 | Lindemann | 260/29 |
| 3,483,171 | 12/1969 | Kuhlkamp et al. | 526/318 |
| 3,485,896 | 12/1969 | Popa et al. | 260/901 |
| 3,491,070 | 1/1970 | Weaver | 260/80.73 |
| 3,501,440 | 3/1970 | Kamio et al. | 526/324 |
| 3,639,326 | 2/1972 | Kray et al. | 526/324 |
| 3,657,174 | 4/1972 | Glabisch et al. | 526/318 |
| 3,690,937 | 9/1972 | Guse et al. | 526/318 |
| 3,708,388 | −1/1973 | Lindemann | 161/247 |
| 3,723,397 | 3/1973 | Hoh et al. | 526/318 |
| 3,755,237 | 8/1973 | Isaacs et al. | 526/324 |
| 3,817,896 | 6/1974 | Bergmeister et al. | 524/823 |
| 3,823,108 | 7/1974 | Bissot | 526/318 |
| 3,923,752 | 12/1975 | Guse et al. | 526/318 |
| 3,969,560 | 7/1976 | Lewis et al. | 526/318 |
| 3,971,766 | 7/1976 | Ono et al. | 526/318 |
| 3,998,997 | 12/1976 | Mowdood et al. | 526/271 |
| 4,001,160 | 1/1977 | Lindemann | 260/29 |
| 4,035,329 | 7/1977 | Wiest et al. | 524/823 |
| 4,048,411 | 9/1977 | Mietzna et al. | 526/324 |
| 4,073,779 | 2/1978 | Wiest et al. | 526/318 |
| 4,151,146 | 4/1979 | Patella | 526/318 |
| 4,245,076 | 1/1981 | Marquardt | 526/318 |
| 4,273,145 | 6/1981 | Lester | 132/1 R |
| 4,299,941 | 11/1981 | Narisawa et al. | 526/324 |
| 4,322,516 | 3/1982 | Wiest et al. | 526/307.7 |
| 4,507,429 | 3/1985 | Lenney | 524/800 |
| 4,510,274 | 4/1985 | Okazaki | 523/411 |
| 4,547,428 | 10/1985 | Bekker et al. | 526/324 |
| 4,564,664 | 1/1986 | Chang et al. | 526/318 |
| 4,610,920 | 9/1986 | Mudge | 428/288 |
| 4,634,629 | 1/1987 | Inaba et al. | 428/343 |
| 4,692,366 | 9/1987 | Mudge | 428/90 |
| 4,702,957 | 10/1987 | Mudge | 428/288 |
| 4,753,846 | 1/1988 | Mudge | 428/343 |

FOREIGN PATENT DOCUMENTS

| | | | |
|---|---|---|---|
| 0185356 | 12/1985 | European Pat. Off. | |
| 0073235 | 6/1978 | Japan | 524/823 |
| 1123879 | 8/1968 | United Kingdom | 526/324 |
| 1188635 | 4/1970 | United Kingdom | 526/324 |
| 1430136 | 3/1976 | United Kingdom | |

OTHER PUBLICATIONS

Stratton, William, "High Shear PS Emulsion Works at High Temperatures," Adhesives Age, Jun. 1985, pp. 21–23.

Dhal, Pradeep K., et al. "Pressure Sensitive Adhesives of Acrylic Polymers Containing Functional Monomers" Polymer, 1982, vol. 23, Jun., p. 937.

CA96(22)184028b; Chemical Abstract: Sayno Chemical Industries, Ltd., Patent Application JP 56/167791 "Low Temperature Flow Improvers".

CA102(8):64744C; Chemical Abstract; Mitsubishi Electric Corp., Patent Application JP 59/138695 "pour Point depressants for Crude Petroleum".

Primary Examiner—Joseph L. Schofer
Assistant Examiner—Alex H. Walker
Attorney, Agent, or Firm—Dec. Ellen T.; Edwin M. Szala

[57] ABSTRACT

Adhesive compositions having a Tg of −45° to −25° C. suitable for application to plasticized polyvinuyl chloride comprising 25 to 40% by weight of a vinyl ester of a alkanoic acid; 10–30% by weight ethylene; 20 to 30% weight of di-2-ethylhexyl maleate or fumerate; 20 to 30% by weight of 2-ethylhexyl acrylate; and 1 to 10% by weight of a monocarboxylic acid.

14 Claims, No Drawings

ETHYLENE VINYL ACETATE-DIOCTYL MALEATE-2-ETHYLHEXYL ACRYLATE INTERPOLYMERS

This application is a division of application Ser. No. 169,632 filed Mar. 17, 1988, U.S. Pat. No. 4,908,268.

BACKGROUND OF THE INVENTION

This invention relates to a process for the preparation of pressure sensitive adhesive compositions in general and especially to those adapted for use on vinyl substrates. The resultant adhesives comprise polymers of ethylene, vinyl ester, di-2-ethylhexyl maleate or the corresponding fumarate, 2-ethylhexyl acrylate, and an unsaturated mono- carboxylic acid.

Pressure-sensitive adhesives function to provide instantaneous adhesion when applied under light pressure. They are characterized by having a built-in capacity to secure this adhesion to a surface without activation, such as by treatment with solvents or heat, and also by having sufficient internal strength so that the adhesive material will not rupture before the bond between the adhesive material and the surface ruptures. The capacity to obtain instantaneous adhesion is usually expressed as the amount of "tack" or "tackiness". Ordinarily it is desirable to obtain as much tack as possible without losing a significant amount of internal strength (cohesion). The latter balance of adhesive and cohesive properties has been difficult to obtain in adhesive polymers since monomers conventionally incorporated into the polymers to increase the cohesive strength generally result in a decrease in adhesive tack.

A specific class of pressure sensitive adhesives are used on vinyl substrates such as are utilized in a wide variety of industrial applications including as vinyl roof tops in automobiles, for decorative trim as in vinyl labels, and decals and in specialty types. Unlike common polyolefin films such as polyethylene and polypropylene, these polyvinyl chloride (PVC) films by nature of their process requirements and high glass transition temperature, require formulation with a number of additives. Some of these are migratory components and will affect the long-term performance of a vinyl decal or label. The amounts and types of additives vary among vinyl formulations, therefore, a wide range of vinyl characteristics are available. A typical flexible PVC film formulation contains a number of additives including plasticizers. Plasticizers used include the migratory monomeric types such as phthalate esters (e.g., dioctylphthalate) or the less migratory polymeric plasticizers (e.g., polyesters, epoxidized soybean oils). These applications require stringent requirements on the adhesive composition. In particular, the vinyl substrates contain substantial amounts of these plasticizers which tend to migrate into the adhesive, especially after aging, the migration of which will destroy the adhesive and cause the bond to fail.

Thus, the use of adhesive-coated flexible polyvinyl-chloride films has traditionally been plagued, to various degrees, by deterioration of properties due to migration of plasticizer out of the PVC film into the adhesive coating. The degree to which this occurs is dependent on the PVC formulation and the adhesive used. In addition to resistance to this plasticizer migration on aging, adhesives for use on vinyl decals must also possess the previously discussed high initial peel values both cohesive and adhesive strength and must inhibit resistance to shrinkage.

Some of the problems encountered with pressure sensitive adhesives are particularly exemplified in the area of adhesive coated plasticized vinyl (PVC) substrates which are heavily influenced by the plasticizer type and level in a PVC film These additives which allow use of PVC for flexible applications are a major cause of the deterioration of polymer coatings applied to PVC. As a result of their more migratory character, monomeric plasticizers will have a bigger effect on adhesive properties than will polymeric plasticizers. All else being equal, the higher the content of monomeric plasticizer in a vinyl film, the more deterioration experienced by the adhesive-coated decal as a function of time. These problems have been addressed in my co-pending application, Ser. No. 009,450 filed Feb. 2, 1987, now U.S. Pat. No. 4,753,846. The compositions claimed in the latter application, while superior to those of the prior art, still leave room for improvement with respect to their cohesive strength properties for certain applications involving vinyl substrates.

SUMMARY OF THE INVENTION

In accordance with the present invention, I have found that pressure sensitive adhesive compositions characterized by a superior balance of adhesive and cohesive properties can be prepared from an emulsion interpolymer containing 25 to 40% by weight of a vinyl ester of an alkanoic acid; 10 to 30% by weight ethylene; 20 to 30% by weight of di-2-ethylhexyl maleate or the corresponding fumarate; 20 to 30% by weight of 2-ethylhexyl acrylate; and 1 to 5% by weight of a mono-carboxylic acid. In formulating these adhesives, it is critical that a specific semi-batch emulsion polymerization process be employed. In accordance therewith all the ethylene and vinyl ester are charged initially together with preferably 50, but up to 75%, of the less reactive maleate monomer. The more reactive acrylate monomer, residual maleate and other functional monomers are then added incrementally over the course of the polymerization.

The resultant adhesives are characterized by an overall balance of adhesive and adhesive properties even after storage of the adhesive coated substrates. As such, the pressure sensitive adhesives find particular application for adhering vinyl substrates and especially for use as adhesives for vinyl decals where a combination of high peel and tack with superior cohesion is required to prevent vinyl shrinkage on the liner.

DESCRIPTION OF THE PREFERRED EMBODIMENTS

The vinyl esters utilized herein are the esters of alkanoic acids having from one to about 13 carbon atoms. Typical examples include; vinyl formate, vinyl acetate, vinyl propionate, vinyl butyrate, vinyl isobutyrate, vinyl valerate, vinyl-2-ethyl-hexanoate, vinyl isooctanoate, vinyl nonanoate, vinyl decanoate, vinyl pivalate, vinyl versatate, etc. of the foregoing, vinyl acetate is the preferred monomer because of its ready availability and low cost. The vinyl ester is present in the copolymer in amounts of about 25 to 40% by weight, preferably 30 to 35%.

The specific dioctyl maleate isomer utilized herein is the di-2-ethylhexyl maleate. Since, after polymerization, the structure of the fumarate and maleate (the cis and the isomers) are the same, the corresponding fumarate ester is also contemplated for use herein. The latter component is present in the copolymer in amounts of about 20 to 30% by weight, preferably about 25%.

Also herein is 2-ethylhexyl acrylate in an amount of 20 to 30% by weight, preferably about 25%, and ethylene in an amount of about 10-30% by weight, preferably 15-25%.

The unsaturated mono-carboxylic acids utilized herein include, for example, acrylic and methacrylic acid or the half esters of maleic acid such as monoethyl, monobutyl or monooctyl maleate, with acrylic acid or monoethyl maleate being preferred. The acid is present in an amount of 1 to 5% by weight, preferably 2 to 4%.

It may also be desired to incorporate in the copolymer minor amounts of one or more functional comonomers. Suitable copolymerizable comonomers include, for example, acrylamide, tertiary octylacrylamide, N-methylol (meth)-acrylamide, N-vinylpyrrolidinone, diallyl adipate, triallyl cyanurate, butanediol diacrylate, allyl methacrylate, etc. as well as $C_2$-$C_3$ hydroxyalkyl esters such as hydroxyethyl acrylate, hydroxy propyl acrylate and corresPonding methacrylates. The latter comonomers are generally used at levels of less than about 5% depending upon the nature of the specific comonomer. In all cases, the $T_g$ of the resultant pressure sensitive adhesive should be within the range of about $-45°$ to $-25°$ C. so the optional comonomers should not be added at levels which will result in polymers outside this $T_g$ range.

In addition, certain copolymerizable monomers which assist in the stability of the copolymer emulsion, e.g., vinyl sulfonic acid, are also useful herein as latex stabilizers. These optionally present monomers, if employed, are added in very low amounts of from 0.1 to about 2% by weight of the monomer mixture.

In accordance with either the Procedures utilized herein the vinyl acetate, ethylene, maleate and acrylate monomers are polymerized in an aqueous medium under pressures not exceeding 100 atmospheres in the presence of a catalyst and at least one emulsifying agent, the aqueous system being maintained by a suitable buffering agent at a pH of 2 to 6, the catalyst being added incrementally or continuously. More specifically, the vinyl acetate and 50 to 75% of the maleate are suspended in water and are thoroughly agitated in the presence of ethylene under the working pressure to effect solution of the ethylene in the vinyl acetate and maleate up to the substantial limit of its solubility under the condition existing in the reaction zone, while the vinyl acetate and maleate are gradually heated to polymerization temperature. The homogenization period is followed by a polymerization period during which the catalyst, which consists of a main catalyst or initiator, and may include an activator, is added incrementally or continuously together with the acrylate and remaining maleate or functional monomers. The monomers employed may be added either as pure monomer or as a premixed emulsion.

Suitable as polymerization catalysts are the water-soluble free-radical-formers generally used in emulsion polymerization, such as hydrogen peroxide, sodium persulfate, potassium persulfate and ammonium persulfate, as well as tert-butyl hydroperoxide, in amounts of between 0.01 and 3% by weight, preferably 0.01 and 1% by weight based on the total amount of the emulsion. They can be used alone or together with reducing agents such as sodium formaldehyde-sulfoxylate, ferrous salts, sodium dithionite, sodium hydrogen sulfite, sodium sulfite, sodium thiosulfate, as redox catalysts in amounts of 0.01 to 3% by weight, preferably 0.01 to 1% by weight, based on the total amount of the emulsion. The free-radical-formers can be charged in the aqueous emulsifier solution or be added during the polymerization in doses.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, ethylene chloride and trichloroethylene, can also be added in some cases.

The emulsifying agents are those generally used in emulsion polymerization, as well as optionally present protective colloids. It is also possible to use emulsifiers alone or in mixtures with protective colloids.

The emulsifiers can be anionic, cationic, nonionic surface-active compounds or mixtures thereof. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethyoxylated alkanols and alkylphenols, as well as esters of sulfosuccinic acid, Suitable cationic emulsifiers are, for example, alkyl quaternary ammonium salts, and alkyl quaternary phosphonium salts. Examples of suitable non-ionic emulsifiers are the addition products of 5 to 50 mols of ethylene oxide adducted to straight-chain and branch-chain alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. When combinations of emulsifying agents are used, it is advantageous to use a relatively hydrophobic emulsifying agent in combination with a relatively hydrophilic agent. The amount of emulsifying agent is generally from about 1 to about 10, preferably from about 2 to about 8, weight percent of the monomers used in the polymerization.

The emulsifier used in the polymerization can also be added, in its entirety, to the initial charge to the polymerization zone or a portion of the emulsifier, e.g. from 90 to 25 percent thereof, can be added continuously or intermittently during polymerization.

Various protective colloids may also be used in place of or in addition to the emulsifiers described above. Suitable colloids include partially acetylated polyvinyl alcohol, e.g., up to 50 percent acetylated, casein, hydroxyethyl starch, carboxymethyl cellulose, gum arabic, and the like, as known in the art of synthetic emulsion polymer technology. In general, these colloids are used at levels of 0.05 to 4% by weight based on the total emulsion.

The process of making the interpolymers of the invention generally comprises the preparation of an aqueous solution containing at least some of the emulsifying agent and stabilizer, and the pH buffering system. This aqueous solution and the initial charge of vinyl ester and maleate are added to the polymerization vessel and ethylene pressure is applied to the desired value. The quantity of ethylene entering into the copolymer is influenced by the pressure, the agitation, and the viscosity of the polymerization medium. Thus, to increase the ethylene content of the copolymer, higher pressures are employed. A pressure of at least about 10 atmospheres is most suitably employed. As previously mentioned, the mixture is thoroughly agitated to dissolve the ethylene, agitation being continued until substantial equilbrium is achieved. This generally requires about 15 minutes. However, less time may be required depending upon the vessel, the efficiency of agitation, the specific system, and the like. When high ethylene contents are desired, a higher degree of agitation should be employed. In any case, by measuring the pressure drop of the ethylene in conventional manner, the realization of substantial equilibrium can be easily determined. Conveniently the charge is brought to polymerization temperature during this agitation period. Agitation can be effected by shaking, by means of an agitator, or other known mechanism. The polymerization is then initiated by introducing initial amounts of the catalyst, and of the activator when used. After polymerization has started, the catalyst and the activator are incrementally added as required to continue polymerization, and the acrylate, residual maleate and any minor functional monomers are similarly added.

The polymerization reaction is generally continued until the residual vinyl ester monomer content is below about 1%. The completed reaction product is then allowed to cool to about room temperature, while sealed from the atmosphere.

The adhesive emulsions are produced and used at relatively high solids contents, e.g. between 35 and 70%, preferably not less than 50%, although they may be diluted with water if desired.

The particle size of the latex can be regulated by the quantity of nonionic or anionic emulsifying agent or protective colloid employed. To obtain smaller particles sizes, greater amounts of emulsifying agents are used. As a general rule, the greater the amount of the emulsifying agent employed, the smaller the average particle size.

If desired, conventional additives may be incorporated into the novel adhesives of our invention in order to modify the properties thereof. Among these additives may be included thickeners, fillers or pigments, such as talc and clay, small amounts of tackifiers, etc.

The emulsion adhesive is useful on any conventional tape or other face stock, especially vinyl substrates such as vinyl films or foils. The adhesive may be applied using conventional techniques. Typical methods involve application of the adhesive onto a release liner by use of mechanical coating processes such as air knife, trailing blade, knife coater, reverse roll or gravure coating techniques. The adhesive is allowed to dry at room temperature and then oven dried at about 250° F. for 10 minutes. The coated release liner may then be laminated to the face stock by a nip roll using pressure between a rubber roll and a steel roll. This technique effects a transfer of the adhesive mass to the face stock with a minimum of penetration.

It will be apparent that various changes and modifications may be made in the embodiments of the invention described above, without departing from the scope of the invention, as defined in the appended claims, and it is intended therefore, that all matter contained in the foregoing description shall be interpreted as illustrative only and not as limitative of the invention.

EXAMPLE 1

This example illustrates the polymerization method used in preparing pressure sensitive adhesives of the present invention.

To a 10 liter autoclave was charged 450 g (of a 20% W/W solution in water) sodium alkylaryl polyethylene oxide sulphate (3 moles ethylene oxide), 40 g (of a 70% W/W solution in water) alkyl aryl polyethylene oxide (30 moles ethylene oxide), 90 g (of a 25% W/W solution in water) sodium vinyl sulphonate, 0.5 g sodium acetate, 2 g sodium formaldehyde sulfoxate, 5 g (of a 1% W/W solution in water) ferrous sulphate solution and 2250 g of water. After Purging with nitrogen, 2000 g of vinyl acetate and 500 g of di-2-ethylhexylmaleate were charged to the reactor. The reactor was then pressurized to 700 psi with ethylene and equilibrated at 50° C. for 15 minutes. The polymerization was then started by metering in a solution of 40 g tertiary butylhydroperoxide in 250 g of water and 25 g of sodium formaldehyde sulfoxylate in 250 g water over 5½ hrs.

Once a two degree exotherm occurred, a pre-emulsified mixture of 500 g of di-2-ethylhexylmaleate, 1000 g of 2-ethylhexylacrylate, 100 g of acrylic acid, 100 g of hydroxypropylacrylate, 4 g dodecylmercaptan, 1 g sodium acetate, 300 g (of a 20% W/W solution in water) sodium alkyl aryl polyethylene oxide sulphate (3 moles ethylene oxide) and 40 g (of a 70% W/W solution in water) alkyl aryl polyethylene oxide (30 moles ethylene oxide) in 400 g of water was added to the autoclave over 4½ hrs uniformly.

The reaction temperature was allowed to rise to 70°-75° C. over 1 hr and kept at this temperature during the polymerization by means of external cooling. At the end of the initiator slow additions, the product was transferred to an evacuated vessel (30 liter) to remove residual ethylene from the system. It was identified as emulsion 1.

Using the general procedure described above, additional emulsions were prepared varying the amounts and/or monomeric compositions. The major and minor monomers utilized and their respective amounts are shown in Table 1. In particular, examples 1, 2 and 3 show the semi-batch polymerization process with varying levels of vinyl acetate and dioctyl maleate and with the preferred process of adding 50% of the di-2-ethylhexyl maleate initially and 50% in the slow-addn. Example 16 is a repeat of example 2. Examples 4 and 5 show two extremes of adding all the di-2-ethylhexyl maleate initially or all in the slow-addn. For further comparison purposes, example 6 shows typical slow addition processes of the prior art while examples 7 and 8 show acrylate/EVA compositions (no maleate) made via slow addition or semi-batch processes. Example 9 shows maleate/EVA composition (no 2-ethylhexyl acrylate) made via batch process. Examples 10 and 11 show vinyl acrylic and competitive all acrylic products for comparison. Examples 12, 13, 14, and 15 show the preferred process of the invention using different functional (minor) monomers and carboxyl and/or varying levels of carboxyl functionality.

TABLE I

| | (Stage 1) | | | | (Stage 2) | | | | | Overall (%) Major Monomers | | | |
|---|---|---|---|---|---|---|---|---|---|---|---|---|---|
| Run No | % INIT VA | % INIT E | % INIT DOM | % INIT EHA | % SA VA | % SA E | % SA DOM | % SA EHA | Process* Type | EHA | VA | DOM | E |
| (1) | 40 | 20 | 10 | 0 | 0 | 0 | 10 | 20 | SB | 20 | 40 | 20 | 20 |
| (2) | 35 | 20 | 10 | 0 | 0 | 0 | 10 | 25 | SB | 25 | 35 | 20 | 20 |
| (3) | 30 | 20 | 10 | 0 | 0 | 0 | 10 | 30 | SB | 30 | 30 | 20 | 20 |
| (4) | 35 | 20 | 20 | 0 | 0 | 0 | 0 | 25 | SB | 25 | 35 | 20 | 20 |
| (5) | 35 | 20 | 0 | 0 | 0 | 0 | 20 | 25 | SB | 25 | 35 | 20 | 20 |
| (6) | 3.5 | 2 | 2 | 2.5 | 31.5 | 18 | 18 | 22.5 | SA | 25 | 35 | 20 | 20 |
| (7) | 3.5 | 2 | — | 5 | 31.5 | 18 | — | 40 | SA | 45 | 35 | — | 20 |
| (8) | 35 | 20 | — | — | — | — | — | 45 | SB | 45 | 35 | — | 20 |
| (9) | 40 | 20 | 40 | — | — | — | — | — | B | — | 40 | 40 | 20 |
| (10) | | | | | | | | | SA | 65 | 35 | — | — |
| (11) | | | | | | | | | Competitive Acrylic Composition | | | | |
| (12) | 35 | 20 | 10 | 0 | 0 | 0 | 10 | 25 | SB | 25 | 35 | 20 | 20 |
| (13) | 35 | 20 | 10 | 0 | 0 | 0 | 10 | 25 | SB | 25 | 35 | 20 | 20 |
| (14) | 35 | 20 | 10 | 0 | 0 | 0 | 10 | 25 | SB | 25 | 35 | 20 | 20 |
| (15) | 35 | 20 | 10 | 0 | 0 | 0 | 10 | 25 | SB | 25 | 35 | 20 | 20 |
| (16) | 35 | 20 | 10 | 0 | 0 | 0 | 10 | 25 | SB | 25 | 35 | 20 | 20 |

*B = Batch
SB = Semi-batch
SA = Slow addition
Key:
EHA = 2 Ethylhexylacrylate
DOM = Di-2-ethylhexyl Maleate
VA = Vinyl Acetate
E = Ethylene
Minor Monomers
Runs 1 thru 9, 16 - 2% acrylic acid/2% hydroxypropylacrylate
Run 10 - 2% acrylic acid/3% hydroxypropylacrylate
Run 12 - 2% acrylic acid
Run 13 - 2% acrylic acid/2% methacrylic acid
Run 14 - 4% acrylic acid
Run 15 - 2% acrylic acid/4% tertiary octyl acrylan The emulsion adhesives were then coated on a plasticized vinyl film and dried in an oven for 5 minutes at 105° C. The resulting dry adhesive deposition was 20 mg./in². The coatings were then tested for peel strength according to the Pressure Sensitive Tape Council, Test Method No. 1, modified to vary the dwell time between placing the coating in contact with the stainless steel test panel and measuring the peel strength. In addition, the bonded test specimens were heat aged as indicated in Table II to accelerate any tendency to lose adhesion on aging on the PVC substrate due to plasticizer migration into the polymer. The aged peel testing was carried out after 7 days aging at 70° C. and recovery times of 20 minutes and 24 hours respectively. The percent shrinkage was measured after aging 24 hours at 70° C. on release liner.

Tests were also performed to evaluate the viscoelastic properties of the polymers. These viscoelastic properties are based on dynamic mechanical analysis (using a rheometer) of polymeric solids and provides a relationship between the polymer structure and product performance. This analysis specifically involves simultaneously, measuring a material response to both elastic and viscous stress. Several quantities can be calculated from the measured strain and stresses. If the test is done in a shear geometry then shear moduli (G) are calculated. Tensile and tending tests measure tensile moduli (E).

For dynamic mechanical analysis, films are cast onto release paper, allowed to air dry one day, then Placed in a 60° C. oven for two days. Final film thickness was approximately 2 mm. To obtain frequency sweeps, the films are scanned at room temperature (25° C.) from 0.1 to 100 Rad/sec at a fixed strain (10%). Storage modulus (G'), viscous modulus (G'') and complex viscosity (ETA) are then plotted.

The elastic modulus (G' or E') of a material is defined as the ratio of the elastic (inphase) stress to strain and relates to the materials' ability to store energy elastically. Similarly, the loss modulus (G'' or E'') of a material is the ratio of the viscous (out of phase) component to the strain, and is related to the materials' ability to dissipate stress through heat. The ratio of these moduli (G''/G' or E''/E') is defined as tan delta, and indicates the relative degree of viscous to elastic dissipation, or damping of the material. The complex viscosity, ETA, can also be defined from the shear moduli. This viscosity can be related to the viscosity measured in a steady shear test by a relationship known as the Cox-Merz law.

Polymers suitable for use in pressure sensitive adhesive applications must be highly viscoelatic. Thus a PSA should have an elastic modulus (G') level between $5 \times 10^4$ and $2 \times 10^5$ Pa at 1 rad/s. This provides sufficient deformation for good flow into a new substrate in short contact times. It is also sufficiently rigid for low creep characteristics at long times.

The results presented in Table II show the superior retention of adhesive properties of the instant polymers (compared to those of the prior art) when subjected to aging on PVC film (vinyl). This is specifically shown by Examples 1, 2, 3 and 16, and especially Examples 2 and 16, the latter illustrating the high initial Peel strengths (3-4 lbs.) and retention of 2.5 to 3 lbs. of this Peel strength on aging relative to the EVA acrylates of the prior art (Examples 7 and 8) and vinyl acrylic current technology (Examples 10 and 11) of 3-4 lb. initial peel strength but lower retention of peel strength on aging of only 1-2 lb.

The test results also show that functional monomers are needed where initial peel strength is desired (see Examples 2, 12, 13, 14, 15 and 16 which show the effects of varying the amounts of functional monomer).

The test results also show the preferred Polymerization procedure to be that described in Example 2 where the dioctyl maleate charge is approximately equally distributed between the initial charge and the slow addition charge. This process provides an adhesive polymer characterized by high initial peel (>3.5 lbs), good retention on aging (>2.5 lbs) and low shrinkage on the liner (below or equal to 1% CD or MD). The differences observed in the adhesive polymer of Example 2 as compared with Example 4 (all dioctylmaleate added initially), Example 5 (slow addition of dioctyl maleate) and Example 6 (slow addition of all monomers) is also shown in the rheometric evaluation of the viscoelastic properties as repeated below.

|  | Tan Delta | $G' \times 10^5$ | $G'' \times 10^5$ | $ETA \times 10^6$ |
|---|---|---|---|---|
| Example 2 | 0.68 | 2.24 | 1.52 | 2.70 |
| Example 4 | 0.81 | 1.04 | 0.84 | 1.34 |
| Example 5 | 0.52 | 1.71 | 0.89 | 1.93 |
| Example 6 | 0.56 | 1.04 | 0.58 | 1.19 |

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

TABLE II

| | End Use Performance Data | | | | | Rheometrics Data | | | |
|---|---|---|---|---|---|---|---|---|---|
| | INITIAL PEEL (lb) | | AGED PEEL (lb) | | SHRINKAGE (%) | | | | (AT 1 RAD/SEC) |
| EX | 20 Min. | 24 Hrs. | 20 Min. | 24 Hrs. | M.D. | C.D. | TAN DELTA | $G' \times 10^5$ | $G \times 10^5$ | $ETA \times 10^6$ |
| 1 | 1.9 | 3.1 | 2.3 | 3.0 | 0.32 | 0.56 | 0.68 | 2.63 | 1.79 | 3.18 |
| 2 | 4.3 | 5.2 | 3.2 | 3.8 | 0.46 | 0.85 | 0.68 | 2.24 | 1.52 | 2.70 |
| 3 | 2.8 | 4.7 | 1.6 | 2.9 | 0.84 | 1.20 | 0.57 | 1.82 | 1.05 | 2.10 |
| 4 | 3.4 | 5.8 | 2.4 | 3.9 | 1.00 | 2.00 | 0.81 | 1.04 | 0.84 | 1.34 |
| 5 | 2.4 | 2.7 | 1.1 | 1.8 | 1.00 | 1.94 | 0.52 | 1.71 | 0.89 | 1.93 |
| 6 | 3.1 | 5.9 | 3.4 | 3.7 | 1.06 | 1.92 | 0.56 | 1.04 | 0.58 | 1.19 |
| 7 | 2.4 | 4.6 | 1.2 | 1.8 | 0.86 | 1.08 | 0.43 | 2.98 | 1.28 | 3.24 |
| 8 | 1.2 | 1.7 | 0.4 | 1.3 | 0.66 | 0.66 | 0.41 | 4.70 | 1.92 | 5.08 |
| 9 | 3.1 | 5.0 | 2.8 | 3.1 | 1.36 | 2.16 | 0.86 | 1.81 | 1.56 | 2.39 |
| 10 | 3.4 | 4.2 | 1.2 | 1.9 | .56 | .54 | 0.37 | 2.97 | 1.10 | 3.13 |
| 11 | 3.2 | 4.4 | 1.2 | 2.9 | .48 | .54 | 0.56 | 2.80 | 1.58 | 3.21 |
| 12 | 2.3 | 3.9 | 2.7 | 2.9 | .78 | .78 | 0.64 | 1.64 | 1.06 | 1.96 |
| 13 | 3.6 | 5.3 | 3.1 | 3.0 | 1.05 | 1.29 | 0.70 | 2.40 | 1.69 | 2.94 |
| 14 | 3.4 | 5.0 | 2.4 | 3.5 | 1.02 | 0.96 | 0.67 | 2.18 | 1.45 | 2.62 |
| 15 | 3.7 | 5.0 | 2.9 | 3.3 | 0.95 | 0.97 | 0.61 | 3.27 | 1.99 | 3.82 |
| 16 | 3.6 | 4.4 | 2.7 | 4.1 | 0.37 | 0.61 | 0.68 | 2.24 | 1.52 | 2.70 |

Notes
Tan Delta = Ratio G"/G'
ETA = Complex Viscosity
G' = Elastic Modulus
G" = Loss Modulus
MD = Machine Direction
CD = Cross Direction

I claim:

1. A process for the production of pressure sensitive adhesive compositions comprising polymerizing, using semi-batch emulsion polymerization techniques, an interpolymer comprising 25 to 40% by weight of a vinyl ester of an alkanoic acid; 10 to 30% by weight ethylene; 20 to 30% by weight of di-2-ethylhexyl maleate or fumarate; 20 to 30% by weight of 2-ethylhexyl acrylate and 1 to 5% by weight of a monocarboxylic acid wherein all the ethylene and vinyl ester are charged initially together with 50 to 75% of the maleate or fumarate and the remaining maleate or fumarate is added incrementally over the course of the polymerization with the acrylate and monocarboxylic acid monomer.

2. The process of claim 1 wherein 50% of the maleate is charged initially and the remaining 50% added incrementally over the course of the reaction.

3. The process of claim 1 wherein the vinyl ester in the interpolymer is selected from the group consisting of vinyl formate, vinyl acetate, vinyl propionate, vinyl butyrate, vinyl isobutyrate, vinyl valerate, vinyl-2-ethyl-hexanoate, vinyl isooctanoate, vinyl nonanoate, vinyl decanoate, vinyl pivalate, and vinyl versatate.

4. The process of claim 3 wherein the vinyl ester in the interpolymer is vinyl acetate.

5. The process of claim 1 wherein the vinyl ester is present in the interpolymer in an amount of 30 to 35% by weight.

6. The process of claim 1 wherein di-2-ethyl hexyl maleate is employed and is present in the interpolymer in an amount of about 25% by weight and wherein the 2-ethylhexyl acrylate is present in an amount of about 25% by weight.

7. The process of claim 1 wherein the acid in the interpolymer is acrylic acid or monoethyl maleate.

8. The process of claim 1 wherein the interpolymer additionally contains up to 5% of at least one copolymerizable comonomer selected from the group consisting of acrylamide, tertiary octylacrylamide, N-methylol (meth)acrylamide, N-vinylpyrrolidinone, diallyl adipate, triallyl cyanurate, butanediol diacrylate, allyl methacrylate, hydroxyethyl acrylate, hydroxy propyl acrylate and the corresponding methacrylates and wherein the amount of the comonomer are such as to maintain the interpolymer within a Tg range of −45° to −25° C.

9. The process of claim 2 wherein the vinyl ester in the interpolymer is selected from the group consisting of vinyl formate, vinyl acetate, vinyl propionate, vinyl butyrate, vinyl isobutyrate, vinyl valerate, vinyl-2-ethyl-hexanoate, vinyl isooctanoate, vinyl nonanoate, vinyl decanoate, vinyl pivalate, and vinyl versatate.

10. The process of claim 2 wherein the vinyl ester in the interpolymer is vinyl acetate.

11. The process of claim 2 wherein the vinyl ester is present in the interpolymer in an amount of 30 to 35% by weight.

12. The process of claim 2 wherein di-2-ethyl hexyl maleate is employed and is present in the interpolymer in an amount of about 25% by weight and wherein the 2-ethylhexyl acrylate is present in an amount of about 25% by weight.

13. The process of claim 2 wherein the acid in the interpolymer is acrylic acid or monoethyl maleate.

14. The process of claim 2 wherein the interpolymer additionally contains up to 5% of at least one copolymerizable comonomer selected from the group consisting of acrylamide, tertiary octylacrylamide, N-methylol (meth)acrylamide, N-vinylpyrrolidinone, diallyl adipate, triallyl cyanurate, butanediol diacrylate, allyl methacrylate, hydroxyethyl acrylate, hydroxy propyl acrylate and the corresponding methacrylates and wherein the amount of the comonomer are such as to maintain the interpolymer within a Tg range of $-45°$ to $-25°$ C.

* * * * *